United States Patent [19]

Serfaty et al.

[11] Patent Number: 4,628,474
[45] Date of Patent: Dec. 9, 1986

[54] MODIFIED DUOBINARY FILTER USING SAW TECHNIQUE

[75] Inventors: Salomon Serfaty, Doar Gaash; Mordechay Cohen, Giv'Atayim, both of Israel

[73] Assignee: Motorola, Inc., Schaumburg, Ill.

[21] Appl. No.: 613,924

[22] Filed: May 25, 1984

[30] Foreign Application Priority Data

May 25, 1983 [GB] United Kingdom ................. 8314478

[51] Int. Cl.$^4$ ............................................. G06G 7/00
[52] U.S. Cl. .................................... 364/825; 364/807; 328/140
[58] Field of Search ............... 364/800, 807, 825, 602, 364/604; 333/165–167, 202, 211, 218, 235; 367/901; 328/140–141; 343/5 AF; 455/313–316

[56] References Cited

U.S. PATENT DOCUMENTS

| | | | |
|---|---|---|---|
| 3,659,229 | 4/1972 | Milton | 364/825 X |
| 3,721,910 | 3/1973 | Wilmanns et al. | 328/141 |
| 3,934,207 | 1/1976 | Fischman et al. | 328/141 X |
| 4,079,325 | 3/1978 | Mawhinney et al. | 328/140 |
| 4,417,317 | 11/1983 | White et al. | 364/825 |
| 4,519,084 | 5/1985 | Langseth | 364/825 X |

OTHER PUBLICATIONS

E. R. Kretzmer, "Binary Data Communication by Partial Response Transmission", *IEEE Annual Communications Conference Record*, 1965, pp. 451–455.

Primary Examiner—Gary V. Harkcom
Attorney, Agent, or Firm—Melvin A. Schechtman; Donald B. Southard; Anthony J. Sarli, Jr.

[57] ABSTRACT

A modified duobinary filter in which an analogue data signal is translated to an intermediate frequency, filtered by a surface acoustic wave filter having a modified duobinary response, and retranslated in the opposite direction to the first frequency translation.

7 Claims, 5 Drawing Figures

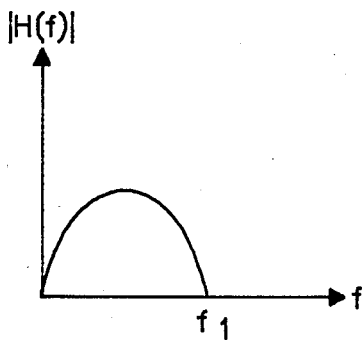
Fig. 1
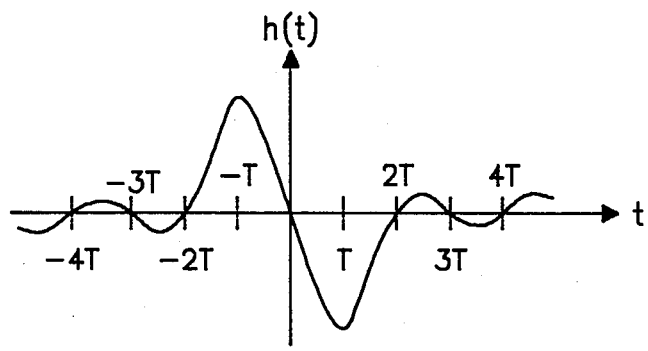
Fig. 2
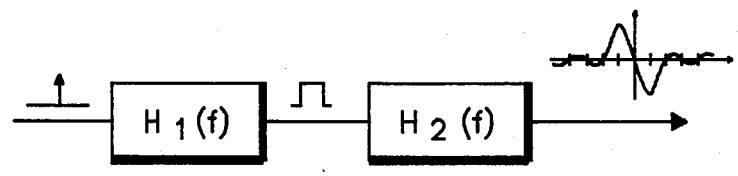

MODIFIED DUOBINARY FILTER USING SAW TECHNIQUE

TECHNICAL FIELD

This invention relates to a modified-doubinary filter suitable for use in partial-response signalling. The invention is particularly applicable to modified-duobinary filtering for data transmission over band-limited channels such as for example an FM-microwave link.

BACKGROUND ART

In order to transmit data a carrier is modulated in accordance with a pre-established digital code. It is known to modulate the carrier using either amplitude, frequency or phase modulation. The time interval occupied by each modulation is known as the symbol (or digit) time interval.

In order to prevent energy appearing in the modulated signal over a wide range of frequencies the modulated signal is filtered. The act of filtering whilst attenuating energy appearing outside the passband of the filter causes the spreading in time of energy in one symbol into succeeding symbols. This effect is known as inter-symbol interference (ISI).

Nyquist proposed a criteria for minimising the effects of ISI based upon the premise of confining each digit to its own time slot to as great an extent as possible, (Nyquist, H; "Certain Factors Affecting Telegraph Speed", Bell System Technical Journal; Vol 3, pp 324–326, April 1924).

The Nyquist criteria represent an ideal situation which cannot be met in practice, because it is not possible to have a precise relationship between the cut-off freuency of an ideal filter and the bit rate.

Partial-response techniques are known (Kretzmer, E. R., "Binary Data Communication by Partial-Response Transmission", Conference Record 1965, IEEE Annual Communications Conference, pp 451-455), and introduce deliberately, a limited amount of ISI over a span of one, two or more digits and capitalise on it. The net result is a spectral reshaping of binary or multi-level pulse trains.

The consequences are significant. For a given bandwidth, partial-response techniques permit the transmission of more bits per second per Hertz than Nyquist-type zero-memory systems for a specified probability-of-error criterion.

One form of partial response technique is the modified-duobinary which involves a correlation span of two digits. The frequency response H(f) of such a modified-duobinary filter is given by $$H(f) = \begin{cases} j\sin(\pi f/f_1) & |f| \leq f_1, \\ 0 & \text{elsewhere,} \end{cases} \quad (1)$$

where:

$f_1 = 1/2T$, and

T is the symbol or digit time interval in seconds.

Known methods of implementing a modified-duobinary filter are by passive filtering with phase equalization and by digital filtering.

There are now requirements to transmit data at high rates, e.g. upwards of 1.5 Mbps through band limited channels, such as microwave links. Both passive filters and digital filters are not able to operate satisfactorily at such high data rates. Also passive filters are generally very complex and expensive.

SUMMARY OF THE INVENTION

This invention seeks to provide a modified duobinary filter arrangement in which the above mentioned disadvantages of known filters are mitigated.

According to the present invention there is provided a modified-duobinary filter arrangement comrising a first mixer for translating the frequency of an analogue data input signal in a first direction to provide a data modulated intermediate frequency (I.F.) signal; a surface acoustic wave filter for filtering the I.F. signal and a second mixer for translating the frequency of the filtered I.F. signal in a second direction opposite to the first direction and wherein the surface acoustic wave filter has a frequency response given by:

$$H_2^{\tau IF}(f) = H_2^{\tau}(f+f_o) + H_2^{\tau}(f-f_o)$$

where $$H_2^{\tau}(f) = \frac{H^{\tau}(f)}{H_1(f)},$$

and $f_o$ is the I.F. frequency $H_1(f) = T$ sinc $f \cdot T$ where T is the symbol interval and $H^{\tau}(f)$ is a truncated version of a function H(f) whose time-domain response h(t) is given by $$h(t) = f_1\left[\frac{\sin 2\pi f_1(t+T)}{2\pi f_1(t+T)} - \frac{\sin 2\pi f_1(t-T)}{2\pi f_1(t-T)}\right]$$

where $f_1 = 1/2T$, and the truncation is defined by $$h^{\tau}(t) = \begin{cases} h(t) & -\tau/2 < t < \tau/2, \\ 0 & \text{elsewhere.} \end{cases}$$

The function $h^{\tau}(t)$ may be weighted to produce a weighted function $h_w^{\tau}(t)$ given by $$h_w^{\tau}(t) = h^{\tau}(t) \cdot w(t)$$

where w(t) is the weighting function expressed in the time-domain.

The weighting function w(t) may be a Kaiser window.

A digital to analogue converter may be provided having an input for receiving digital data and an analogue output coupled to feed analogue data to the first mixer.

The input for receiving digital data may be an input for parallel data.

A serial to parallel converter may be provided having a parallel data output coupled to the input of the digital to analogue converter and an input for receiving serial data.

A low pass filter may be provided for filtering an output signal derived from the second mixer.

BRIEF DESCRIPTION OF THE DRAWINGS

An exemplary embodiment of the invention will now be described with reference to the drawings in which;

FIG. 1 illustrates the theoretical frequency and time-domain responses of a modified-duobinary filter.

FIG. 2 is an explanatory figure illustrating an approach to the implementation of a filter arrangement in accordance with the present invention.

DESCRIPTION OF THE PREFERRED EMBODIMENT

Figure 3:
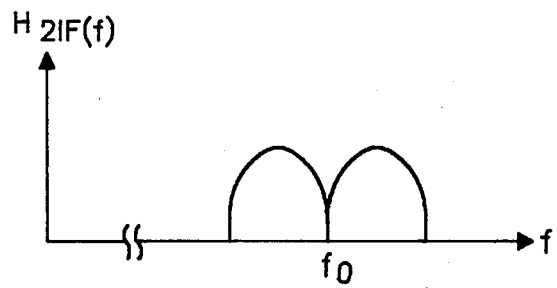
FIG. 3 shows the frequency response of a filter arrangement in accordance with the present invention.

The modified-duobinary frequency response is given by equation 1 above. The time-domain response (the response of the filter to a Dirac $\delta$ at its input) is derived from the inverse Fourier transform of H(f) and is given by $$h(t) = f_1 \left[ \frac{\sin 2\pi f_1(t+T)}{2\pi f_1(t+T)} - \frac{\sin 2\pi f_1(t-T)}{2\pi f_1(t-T)} \right]. \quad (2)$$

Since the frequency response is limited in frequency, the time-domain response is not limited extending from $-\infty$ to $+\infty$.

The frequency response H(f) and the time domain response h(t) are both illustrated in FIG. 1 of the drawings.

The function h(t) has two fundamental properties which are (1) $h(t) = h(-t)$ and more particularly $h(-T) = h(+T)$ (2) $h(nT) = 0$ for $n = 0, \pm 2, \pm 3, \pm 4, \pm \ldots$.

It is important not to change these properties.

In producing the modified duobinary filter arrangement of the present two important points were considered.

Firstly, it is impossible to synthesize a filter having a non-limited impulse response. Some criteria must be used in order to make the filter feasible. It is therefore necessary to truncate the impulse response, making a limited impulse response and thus obtaining a non-limited frequency response. In a preferred practical implementation of a filter arrangement of the invention the turncation of the impulse response is done in such a way that the attenuation of the frequency response with respect to its maximum is at least 30 dB for $f \geq 1.06 f_1$.

A second problem is that if such an impulse response is achieved, in order to obtain the modified-duobinary signal at the output of the filter it is necessary to make the input signal Dirac $\delta$'s.

Instead of this the input consists of pulses of width T and this is taken into account at the input of the filter. The filter arrangement can be envisaged as being composed of two filters, a first filter having an impulse response in the form of a pulse of width T and the second with a modified-duobinary response to an input being a pulse of width T.

If H(f) is the total frequency response to be achieved, then H(f) can be expressed as a product of two frequency responses $$H(f) = H_1(f) \cdot H_2(f)$$

Where

H(f) = modified-duobinary response
$H_1(f)$ = frequency response of a filter having as an impulse response a pulse of width $T = 1/2f_1$
$H_2(f)$ = frequency response of a filter the response of which to a pulse of width T is the modified-duobinary response.

This is illustrated in FIG. 2 of the drawings.

For $H_1(f)$ we have that $$H_1(f) = T \operatorname{sinc} f \cdot T \quad (3)$$

where $$\operatorname{sinc} x = \frac{\sin \pi x}{\pi x}.$$

Thus the filter to be synthesized is $H_2(f)$, and $$H_2(f) = \frac{H(f)}{H_1(f)}.$$

In accordance with the present invention rather than implement $H_2(f)$, a new function, related to $H_2(f)$, is implemented. This function designated $H_{2IF}(f)$ is actually $H_2(f)$ translated to an I.F. frequency $f_o$ and thus $$H_{2IF}(f) = H_2(f+f_o) + H_2(f-f_o). \quad (5)$$

The frequency response of such a filter is shown in FIG. 3.

In accordance with an embodiment of the invention, the function $H_{2IF}(f)$ is synthesized, an analogue data input signal is translated to this I.F. frequency with an up mixer, and the resulting signal is filtered by the response $H_{2IF}(f)$ and translated in the opposite direction with a down mixer.

The function $H_{2IF}(f)$ is implemented by means of a surface acoustic wave (SAW) filter. Such a filter type however, has a finite impulse response whilst the function $h_{2IF}(t)$ is an infinte impulse-response function.

Truncation must be applied but without affecting the two important properties of h(t) i.e. $h(t) = h(-t)$ and $h(nt) = 0$ for $n = 0, \pm 2, \pm 4$ etc.

Further in accordance with the invention the function h(t) is truncated to produce a truncated version $h^\tau(t)$ such that $$h^\tau(t) = \begin{cases} h(t) & -\tau/2 < t < \tau/2, \\ 0 & \text{elsewhere,} \end{cases} \quad (6)$$

where $\tau$ is the truncation interval.

Figure 4:
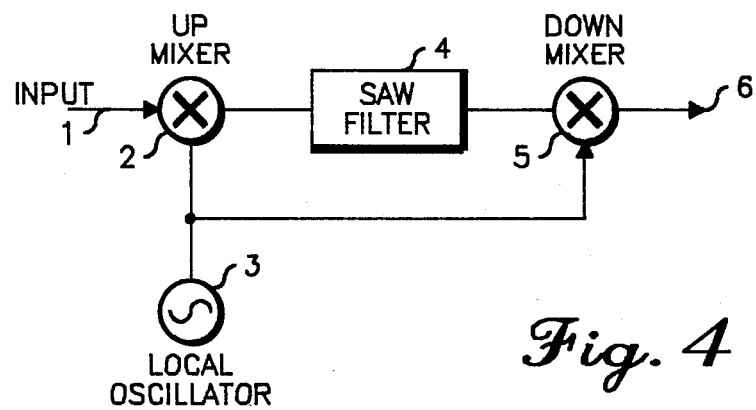
FIG. 4 is a schematic illustration of an embodiment of a filter arrangement of the present invention and FIG. 5 is a schematic illustration of an embodiment of a filter arrangement in accordance with the invention and forming part of a data transmission system.

Referring now to FIG. 4 there is shown an exemplary embodiment of a modified-duobinary filter arrangement in accordance with the present invention.

Analogue data input signals are fed as input signals from an input terminal 1 to one input of a first and up mixer 2 which they are mixed with a local oscillator frequency fed from a local oscillator 3 to a second input of the mixer 2.

Output signals from the mixer 2 at an I.F. frequency $f_o$ are filtered by a surface acoustic wave filter 4 which has the modified duobinary response $H^\tau_{2IF}(f)$ where the suffix $\tau$ indicates truncation and the truncation function is defined by equation 6.

Filtered output signals obtained from the surface acoustic wave filter 4 are frequency translated in the opposite direction to that achieved by the mixer 2 by means of a second and down mixer 5 to provide an output signal at an output terminal 6.

In order to achieve a better frequency performance the function $h^\tau(t)$ may be weighted to produce a weighted function $h_w^\tau(t)$.

Preferably the weighting function is a Kaiser window.

The weighted function $h_w^\tau(t)$ may be expressed as $$h_w^\tau(t) = h^\tau(t) \cdot w(t)$$

and $$H_w^\tau(f) = H^\tau(f) * W(f)$$

where * denotes convolution.

Thus for the expression $H_w^\tau(f)$ we have for $H_2^\tau(f)$ $$H_2^\tau(f) = \frac{H_w^\tau(f)}{H_1(f)}$$

$h_2^\tau(t)$, the inverse Fourier transform of $H_2^\tau$, is a finite function in the time domain. As explained above, the frequency translated version $h^\tau{}_{2IF}(t)$ is implemented in the frequency domain $H^\tau{}_{2IF}(f)$, and in accordance with the invention this implementation is accomplished by means of a SAW filter.

To produce a practical embodiment two non-independent parameters must be chosen, namely the frequency of the local oscillator, which is the centre frequency of the SAW filter (related to the sampling rate of its finite impulse response equivalent), and the truncation interval $\tau$. The determination of the parameters depends upon the desired frequency response.

In order to achieve 30 dB attenuation for $1.06f_1$ a centre frequency of 40.135 MHz may be chosen and the truncation interval is then $\tau = 8T$.

In a practical embodiment the surface acoustic wave filter may be formed on ST Quartz as an interdigital filter. The required attenuation of the filter at a frequency of $1.06f_1$ determines the length of the filter. The finger spacing of the interdigital fingers of the filter is determined by the chosen centre frequency whilst the finger overlap pattern is set by the desired time domain response of the filter as defined above.

Figure 5:
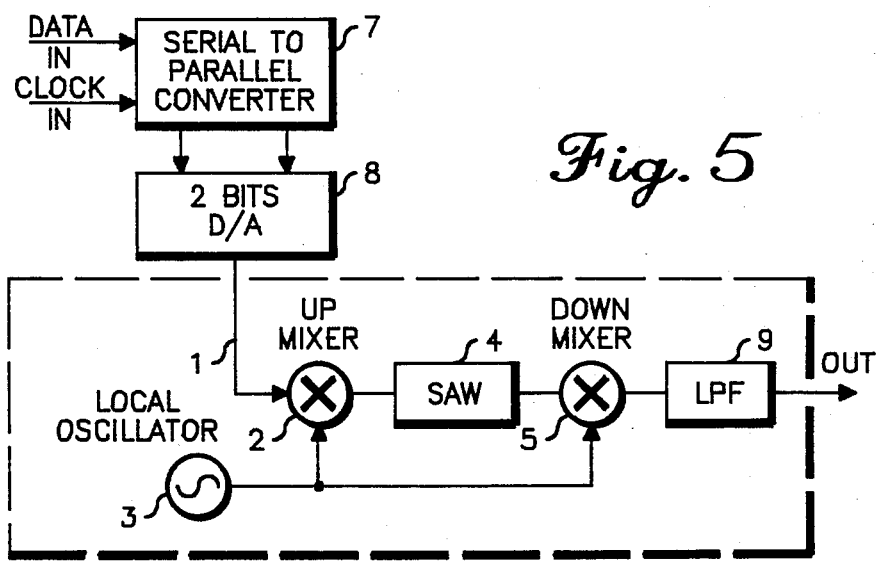

Referring now to FIG. 5 where like parts to those of FIG. 4 bear like reference numerals there is shown a filter arrangement in accordance with the invention and forming part of a data transmission system.

Serial data is clocked into a serial to parallel converter 7 where it is converted into two parallel bits (dibits). The dibits are converted into one of four analogue levels by means of a two bit D/A converter 8 and fed to the up mixer 2 which in conjunction with oscillator 3, SAW filter 4 and mixer 5 comprise the filter arrangement of FIG. 4.

Output signals from the mixer 5 are subsequently filtered by means of a low pass filter 9 to remove harmonics.

Utilising a SAW filter as described and four analogue data levels produces a seven level partial-response scheme.

It is possible to transmit one T1 bit stream (1.544 Mbps) in a bandwidth of 408 kHz achieving a 3.78 b/s/Hz compression. Degredation due to intersymbol interference may be less than 0.7 dB due to the inherent properties of the SAW filter which can achieve a given shape with no phase distortion because it is a linear phase filter.

A modified-duobinary filter arrangement may be produced in accordance with the invention which is less complex and costly than known arrangements and which may transmit data at higher rates.

Although the present invention has been described in connection with a particular application and preferred embodiment, it is to be understood that additional embodiments and applications of the invention, which will be obvious to those skilled in the art, are included within the scope of the invention.

We claim:

1. A modified-duobinary filter arrangement for filtering data symbols spaced at time intervals T, comprising:
   a first mixer for translating the frequency of an analogue data input signal in a first direction to provide a data modulated intermediate frequency (I.F.) signal;
   a surface acoustic wave filter for filtering the I.F. signal, and
   a second mixer for translating the frequency of the filtered I.F. signal in a second direction opposite to the first direction;

wherein the surface acoustic wave filter has a transfer function response, H(f), as a function of frequency, f, given by:

$$H_2^\tau IF(f) = H_2^\tau(f+f_o) + H_2^\tau(f-f_o)$$

where:

$$H_2^\tau(f) = \frac{H^\tau(f)}{H_1(f)},$$

$f_o$ is the I.F. frequency, and $$H_1(f) = \frac{T\sin(\pi fT)}{\pi fT};$$

where:

T is the symbol time interval, and
$H^\tau(f)$ is a truncated version of a function H(f) whose time-domain response h(t) is given by:

$$h(t) = f_1 \left[ \frac{\sin 2\pi f_1(t+T)}{2\pi f_1(t+T)} - \frac{\sin 2\pi f_1(t-T)}{2\pi f_1(t-T)} \right]$$

where:
$f_1 = 1/2T$,
and the truncation is defined by:

$$h^\tau(t) = \begin{cases} h(t) & -\tau/2 < t < \tau/2, \\ 0 & \text{elsewhere,} \end{cases}$$

where $\tau$ is the truncation interval.

2. A filter arrangement as claimed in claim 1 wherein the function h(t) is weighted to produce a weighted function $h_w^\tau(t)$ given by $$h_w^\tau(t) = h^\tau(t) \cdot w(t)$$

where w(t) is the weighting function expressed in the time-domain.

3. A filter arrangement as claimed in claim 2 wherein the weighting function w(t) is a Kaiser window.

4. A filter arrangement as claimed in claim 1 wherein a digital to analogue converter is provided having an input for receiving digital data and an analogue data output coupled to feed analogue data to the first mixer.

5. A filter arrangement as claimed in claim 4 wherein the input for receiving digital data is an input for parallel data.

6. A filter arrangement as claimed in claim 5 wherein a serial to parallel converter is provided having a parallel data output coupled to the input of the digital to nalogue converter and an input for receiving serial data.

7. A filter arrangement as claimed in claim 4 wherein a low pass filter is provided for filtering an output signal derived from the second mixer.

* * * * *